Patented May 19, 1953

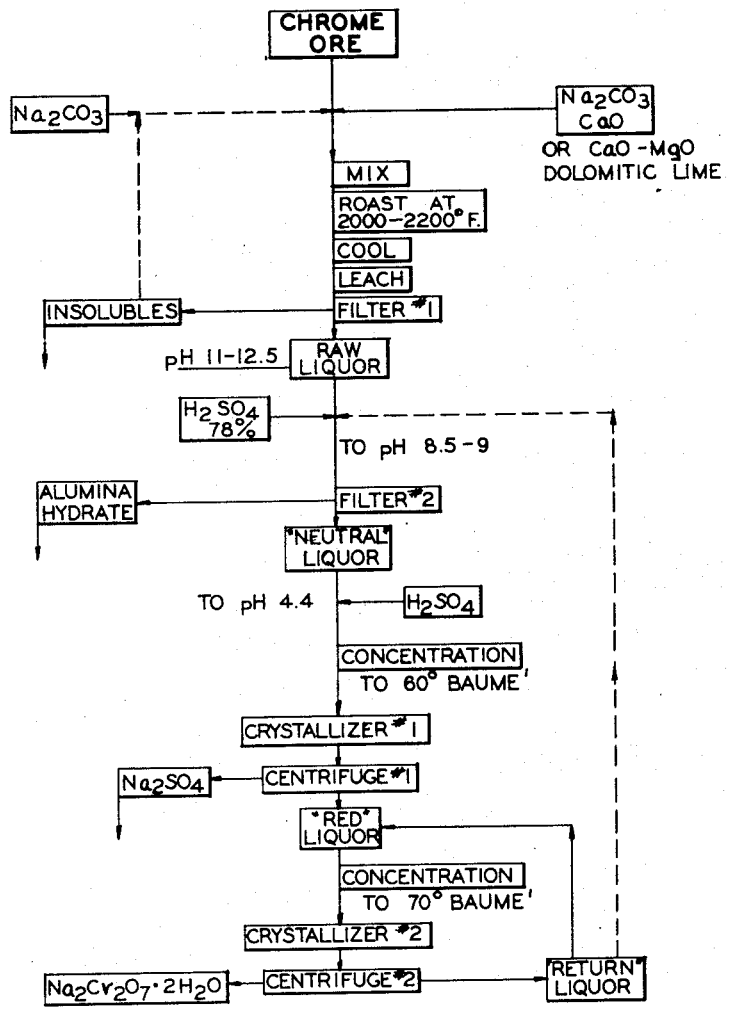

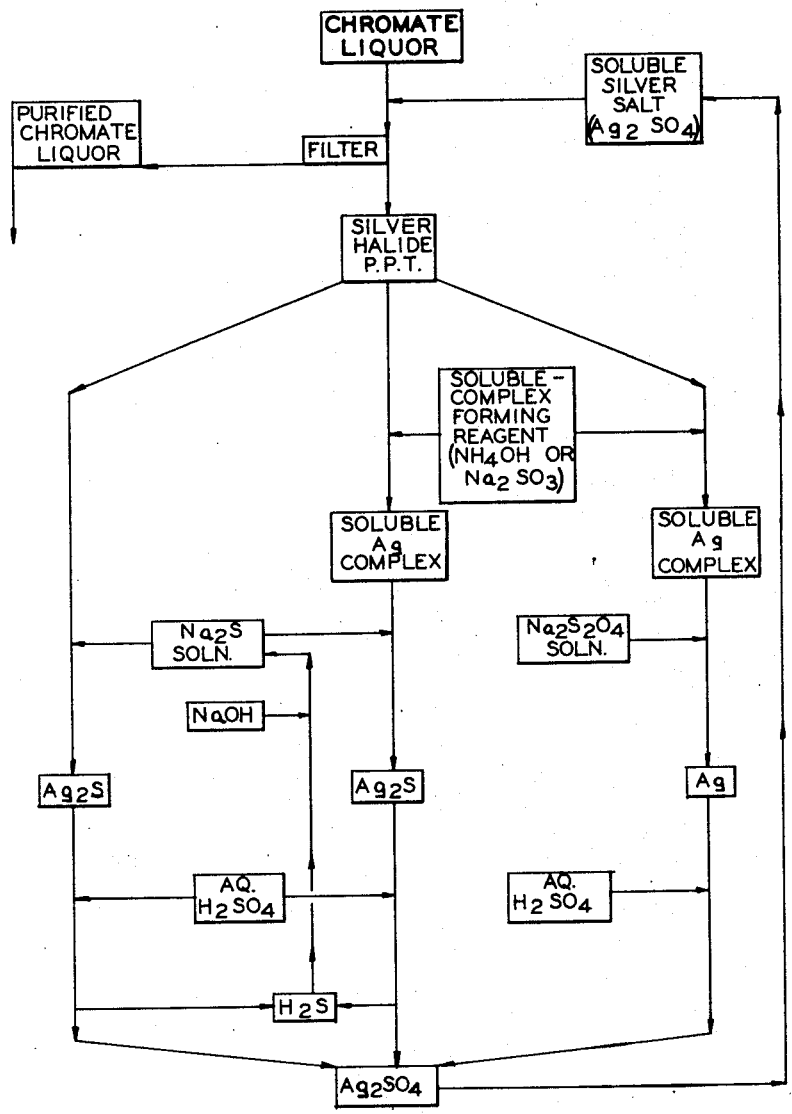
FIG. II

2,639,216

UNITED STATES PATENT OFFICE 2,639,216

REMOVAL OF HALIDE IONS FROM CHROMATE LIQUORS

Robert G. Banner, Painesville, Ohio, assignor to Diamond Alkali Company, Cleveland, Ohio, a corporation of Delaware Application February 11, 1949, Serial No. 75,796

5 Claims. (Cl. 23—56)

This invention relates to a method for purifying aqueous liquors and more particularly relates to a method for removing halide ions from aqueous liquors obtained from the leaching of alkaline, chrome ore roasts in manufacture of chromate salts from chrome-bearing ores.

In the manufacture of alkali metal chromates and bichromates from chrome-bearing ores, it is customary to roast such ores with relatively large amounts of alkaline materials, such as alkali metal carbonates and alkaline earth metal carbonates, in order to oxidize the chrome-bearing constituents of the ore to alkali metal chromate compounds, and subsequently to leach the alkaline roast material with water in order to recover the soluble chromate salts therefrom. Thereafter, the solution of alkali metal chromate salts is further processed in order to obtain the solid alkali metal chromate and bichromate salts. From the chemical substances used in such processing of the alkali metal chromate liquors, the chromate and bichromate salts obtained therefrom become associated with appreciable and undesirable amounts of alkali metal and alkaline earth metal halides, particularly alkali metal chlorides. When the crystallization of the alkali metal chromates and alkali metal bichromates is attempted from such process liquors, the alkali metal halide salts associated therewith crystallize simultaneously and thereby contaminate such salts. When these chromate salts are subsequently used in the preparation of high grade chromium chemicals, such as the chromate pigments used in printing inks and paints, the preparation of chromic acid for chrome plating baths, oxidation of organic materials, and the like, the alkali metal chlorides therein contained are a source of process equipment corrosion problems. Moreover, in the alkaline roast process for the recovery of chromate salts from chromate ores, it is necessary that the mother liquor obtained from the crystallization of either the chromate or bichromate salts be recycled in the system in order that the maximum of the chromate values be recovered from the process liquors. It will be appreciated by those skilled in the art that such recycling of the mother liquor necessarily results in the accumulation in the process system of excessive amounts of the chloride ions in the liquors.

It has heretofore been proposed to remove the chloride ions from the alkali metal chromate process liquors by periodically purging the system, for example, by discarding the mother liquor from the various crystallization process steps entirely, or to sell the discarded liquors to consumers of low grade chromate chemical solutions. It will be appreciated that such practice results in appreciable losses of valuable chromate constituents of the chromate liquors, thereby lessening the economic advantages of the process.

In contrast to the prior art proposal, the present invention contemplates a simple, efficient cyclic method for the purification of chromate liquors by the removal of the chloride ions therefrom, in which method silver ions are utilized as a precipitant for the chloride ions, which silver ions may be recycled in the system without appreciable losses thereof and without contamination of the aqueous chromate liquor by extraneous ions. Moreover, the aqueous leach liquors, with which the chloride and chromate salts are generally associated, are more highly refined by the method of the present invention with respect to the separation of these two components than by the wasteful purging method previously employed in the art.

The advantages referred to hereinabove may be more fully understood and appreciated by a description first, of the conventional process for the recovery and purification of chromate salts from chrome-bearing ores and second, by a description setting forth in detail the manner in which the method of the present invention is co-ordinated with such process.

Referring now to the drawings which form a part hereof,

Fig. I is a chemical process flow-sheet of a conventional alkali roast method of treating chrome ores to recover the chrome values therefrom, and, Fig. II is a chemical process flow-sheet showing various alternate methods of cyclic operation employing the teaching of the present invention.

Referring now to Fig. I, a chrome-bearing ore is comminuted and mixed with sodium carbonate and calcium oxide or dolomitic lime (CaO—MgO). One purpose of the sodium carbonate is to react with the chromium and aluminum oxides of the ore to form water-extractable compounds thereof. The lime is employed primarily to maintain a granular consistency in the roast mix during the roasting process, which may suitably be carried out in a rotary kiln or other convenient roasting process means, and secondarily, to diminish the amount of water-extractable vanadium salts formed during the roasting of the ore, vanadium being present in such ores to a minor extent. The roasting of the mix is carried out at a temperature ranging between 2000° and 2200° F., after which the roast is cooled and leached with water.

As a result of the leaching step, an aqueous liquor containing sodium chromate, sodium vanadate, sodium aluminate, and other salts, and an insoluble residue are obtained. The liquor and residue may be separated by filtration, as at filter No. 1. The residue is dried and combined with further amounts of sodium carbonate (this time without the addition of lime), as indicated by the dotted line to the left of the main stream of Fig. I, and separately recycled in the roasting and leading process hereinabove described, with the result that further amounts of the chrome values contained in the roast residue are thereby removed. The leach liquor from the first roast and the liquor from the recycle roast are combined and are designated in Fig. I as "raw liquor" and as shown, ordinarily have a pH within the range of 11–12.5. The "raw liquor" is treated with sulfuric acid (73%) or with acidic solutions recovered subsequently in the process, to bring the pH of the "raw liquor" within the range of 8.5–9 in order to precipitate alumina hydrate. The alumina hydrate is derived from aluminum oxide, which occurs in the ore in substantial quantities, of the order of 10–15%. The alumina hydrate may be separated from the aqueous partially neutralized liquors by filtration, as at filter No. 2, the filtrate then being referred to as "neutral liquor."

The "neutral liquor" is next acidified with sulfuric acid (78%) to bring the pH of the solution to about 4.4, whereupon chromate ion is converted to bichromate ion in the solution. Thereafter, the solution may be suitably concentrated, preferably to about 60° Bé., and then cooled to approximately room temperature. The concentration and cooling steps result in the crystallization of sodium sulfate, at crystallizer No. 1, the mother liquor comprising the chromate values as bichromates. The crystallized sodium sulfate is removed from the mother liquor by centrifuging, as at centrifuge No. 1. The acid mother liquor, after the removal of sodium sulfate, is referred to as "red liquor." The "red liquor" is further concentrated in order to crystallize the bichromate values therefrom. After suitable concentration, for example, to 70° Bé., and cooling, sodium bichromate crystallizes from the concentrated "red liquor" at crystallizer No. 2 and is centrifuged at centrifuge No. 2 to remove the mother liquor, which liquor is designated as "return liquor." The crystals of sodium bichromate are the finished product of the process and are, if no "return liquor" has been used in make-up of the "red liquor," reasonably free of chlorides and other halide impurities. However, as pointed out more fully below, "return liquor" usually is employed and in such case, the "red liquor" is contaminated with halide ions to the extent of 0.4 to 2%, calculated as sodium chloride. Such halide concentration is derived principally from the water used in the leaching process and to a minor extent from the sulfuric acid, which is usually a technical grade in view of economic considerations. Such concentration of halide ion carried over to and concentrated in the product chromate salts is sufficient to cause corrosion difficulties in processing equipment used in the oxidation of organic materials and to detract seriously from the value of the bichromate as a raw material for the preparation of chromic acid for the same reason.

The "return liquor" carries with it appreciable amounts of the chrome values as well as halide ions which have not been removed with the bichromate crystals. Since the "return liquor" has a pH very close to that of the "red liquor" from centrifuge No. 1, such "return liquor" is returned to the main stream via the "red liquor" for further concentration and crystallization of the bichromates dissolved therein, or is returned to the main stream as indicated by the dotted line to the right of the main stream of Fig. I, as a part of the acid required to neutralize "raw liquor." It will be appreciated that such recycling of the "return liquor" ultimately results in accumulating an undesirable amount of halide salts within the system, which salts, as pointed out hereinabove, contaminate the bichromate crystals obtained therefrom and adversely affect the grade of chromate salts to be obtained, as well as corroding chemical process equipment in which they are used. However, discarding the "return liquor" is not a satisfactory solution to the problem since economically, wasteful quantities of bichromate salts are thereby lost.

The method of the present invention provides a simple and easily commercially adaptable process for the continuous removal of the halide ions from chromate liquors. In particular, the present invention may be employed with chromate liquors taken at any stage in the process of Fig. I after the precipitation of the alumina hydrate and the obtaining of "neutral liquor." Moreover, in the practice of the present invention, it is usually preferred for economic reasons to recover substantially all of the silver in a soluble form from the silver halide precipitate, and it is therefore in general preferable to provide for such recovery in the integration of the method of the present invention with the conventional alkali roast process for the recovery of chromate salts from chrome-bearing ores.

Referring now to Fig. II of the drawings, the term "chromate liquor" may be the "neutral liquor" of Fig. I but preferably is either the "red liquor" or the "return liquor" of Fig. I. Thus, the method of the present invention may be interposed within the process of the flow-sheet of Fig. I prior to the removal of the sodium sulfate therefrom, prior to the crystallization of the sodium bichromate dihydrate, or for the treatment of the mother liquor from the crystallization of the sodium bichromate dihydrate.

The chromate liquor to be purified is treated with a solution of a relatively soluble silver salt, such as silver nitrate, or silver sulfate, preferably, however, with silver sulfate because this salt does not introduce foreign ions into the chromate liquor other than those already present or subsequently to be removed therefrom. It is also preferable that the silver salt be combined with the chromate liquor in an amount slightly less than that stoichiometrically equivalent to the amount of chloride ions present in the chromate liquors, for the reason that such practice necessarily substantially precludes the precipitation of silver chromate with the silver halide, whereby undesirable losses of chromate values from the chromate liquors are avoided. Also in this connection, it is not necessary to remove absolutely all of the halide ions present in the chromate liquors, the removal of such portion of such halide ions as will prevent the subsequent crystallization of metal halide salts with the alkali metal chromates or bichromates being sufficient. Accordingly, the silver halide precipitate is separated from the chromate liquor by any suitable method, such as filtration as indicated in Fig. II. The filtrate from this step is thereafter carried through the subsequent steps in the chrome recovery process, depending upon which process liquor was subjected to treatment.

As noted above, and particularly for economic reasons, the recovery and reuse of the silver is preferred in the practice of the present invention. Despite the expensiveness of silver, such recovery permits the invention to be practiced even in fairly large scale chrome recovery operations since, in view of recycling, a relatively small stock of silver need be kept on hand. Accordingly, the recovered silver chloride precipitate may suitably be solubilized and returned to the system to remove further halide ion, the returned silver preferably being in the form of silver sulfate for reasons adverted to above. This recycle of silver may be accomplished in several ways.

For example, the silver halide precipitate may be treated directly with an aqueous solution of a soluble sulfide, such as sodium sulfide, whereby the silver halide is converted to insoluble silver sulfide. If desired, and as indicated by Fig. II of the drawings, the silver halide salt may be dissolved in concentrated aqueous ammonia or other soluble-complex forming reagent and thereafter the solution of silver halide complex may be treated with a soluble sulfide in the manner described above. The insoluble silver sulfide which results from either of the above described steps is then decomposed with a suitable acid, such as nitric or sulfuric, or a mixture thereof, in order to render the silver portion of the precipitate soluble and to convert the sulfide portion thereof to hydrogen sulfide. As noted hereinabove, it is preferred in the method of the present invention to convert the silver sulfide precipitate to silver sulfate and it is therefore preferable to treat the silver sulfide precipitate with a relatively dilute solution of sulfuric acid, such as a 1:1 volume dilution of the acid with water. The decomposition of the silver sulfide precipitate in sulfuric acid is somewhat accelerated by the addition thereto of a relatively minor amount of nitric acid or other suitable oxidizing acidic material. As indicated in Fig. II of the drawings, the hydrogen sulfide from the decomposition of the silver sulfide precipitate may suitably be reacted with aqueous alkali, such as aqueous caustic soda, to convert the same to sodium sulfide, which may thereafter be recycled in the process to precipitate further quantities of silver sulfide. The recovered silver sulfate in sulfuric acid solution may be recycled to the process as such in order to precipitate further quantities of silver halide from the chromate process liquors, or the silver sulfate salt may be isolated as such and recycled for this purpose. The addition of the silver sulfate salt to the chromate process liquors may be carried on substantially continuously as indicated in Fig. II of the drawings, or such addition may be made as the condition of the process liquors indicates from time to time somewhat in the manner of, and as a substitute for, the prior art method of purging the system of the halide ions.

In order that those skilled in the art may become more familiar with the details of the method of the present invention and the preferred manner by which the same may be carried into effect, the following specific examples are offered:

*Example I*

100 mls. of "neutral liquor," containing 0.409 gm. of metal halides per liter, calculated as sodium chloride, are transferred to a beaker and 7 mls. of 0.1 N silver nitrate are added thereto with vigorous agitation. The solution is allowed to stand for about 15 minutes, after which time a silver halide precipitate settles to the bottom of the container; the precipitate and solution are separated by filtration. Analysis of the filtrate liquor shows that somewhat over 90% of the chloride ion is removed from the "neutral liquor" by this procedure. The precipitated silver halide is washed free of mother liquor and thoroughly dried at 130° C. for two hours. The amount of dried precipitate recovered indicates that 100% of the silver salt added to the "neutral liquor" is recovered in the precipitate.

*Example II*

The silver halide precipitate from Example I is dissolved in concentrated ammonium hydroxide and an aqueous solution of sodium sulfide, containing an amount of sulfide ion in stoichiometric excess of the silver, is added to the ammonium hydroxide solution. A precipitate of silver sulfide is formed within a very few minutes, coagulates rapidly, and settles to the bottom of the container. The precipitate and solution are separated by filtration and the filtrate is tested for silver ion content. The test for silver ion shows that all of the silver in the solution of the precipitate of silver halide has been precipitated as silver sulfide. The silver sulfide precipitate is quantitatively transferred to a suitable container and contacted with a 1:1 volume dilution of sulfuric acid and water with a few drops of concentrated nitric acid added thereto. Decomposition of the silver sulfide and solution of the silver sulfate takes place very rapidly. The solution of silver sulfate is recycled to further quantities of "neutral liquor" for the removal of halide ion therefrom.

*Example III*

A 100 ml. portion of neutral liquor," having the same concentration of halide ion as that employed in Example I above is mixed with 7 mls. of 0.1 N silver nitrate solution. The precipitate which forms is dissolved in ammonium hydroxide, after separation from the mother liquor by filtration, and contacted with sodium hydrosulfite ($Na_2S_2O_4$) in slight excess of the stoichiometric amount, after which metallic silver substantially immediately begins to precipitate. After the precipitated silver metal has settled to the bottom of the container, the solution and precipitate are separated by filtration and the silver metal recovered and dissolved in a 1:1 volume dilution of sulfuric acid and water. Inasmuch as this metallic silver is in a very finely divided state, the solution thereof takes place rapidly and the resulting solution is recycled to further quantities of "neutral liquor" for further removal of halide ions therefrom.

The dissolution of the silver halide precipitate by means of concentrated aqueous ammonium hydroxide or other soluble-complex forming reagent, and the precipitation therefrom of either metallic silver or silver sulfide, may be dispensed with if desired and the silver values recovered in the form of a soluble silver salt, such as silver sulfate, in the following manner:

*Example IV*

Precipitation of the silver halide is carried out substantially as described in Examples I, II, and III above. The silver halide precipitate, after separation from the mother liquor by filtration, is slurried directly with an aqueous solution of sodium sulfide containing from two to four times the stoichiometric equivalent of sulfide ion. Decomposition of the silver halide precipitate takes place very rapidly with the formation of a silver sulfide precipitate. Thereafter, the silver sulfide precipitate is treated precisely in the manner described for Example II above, i. e., the precipitate is treated with a 1:1 volume dilution of sulfuric acid and water containing a few drops of nitric acid, thus forming an aqueous solution of silver sulfate and evolving hydrogen sulfide. The solution of silver sulfate formed is recycled to further quantities of "neutral liquor" for precipitation of the halide ions therein contained.

As stated hereinabove, other liquors in the conventional alkali roast process for the recovery of chrome values from chrome ores may also be employed in the practice of the method of the present invention, particularly in the following manner.

*Example V*

A 100 ml. portion of "red liquor," containing 2.14 gms. of metal halides per liter, calculated as sodium chloride, is treated with 0.646 gm. of silver nitrate in aqueous solution. The silver chloride precipitate is separated from the mother liquor by filtration, dissolved in concentrated aqueous ammonium hydroxide and an amount of sodium sulfide in excess of the stoichiometric equivalent of sulfide ion required to precipitate the silver ion therefrom, is added to the solution of the silver halide precipitate. After the silver sulfide precipitate has settled, separation of precipitate and mother liquor is effected, as described in the examples above. The precipitate of silver sulfide is washed free of the mother liquor, dried, and weighed. The weighed precipitate shows that 99.8% of the silver originally added to the "red liquor" is recovered in the silver sulfide precipitation. Solution of the silver sulfide precipitate with dilute (1:1) sulfuric acid, to which has been added a few drops of nitric acid, is effected in the same manner as described in the previous examples and the aqueous solution of silver sulfate is then recycled to further quantities of "red liquor" for removal of halide ions therefrom.

*Example VI*

A 100 ml. portion of "return liquor," containing 3.1 gms. of sodium chloride per liter, is mixed with an aqueous solution of silver sulfate containing 1.56 gms. of silver sulfate, and the silver halide precipitate thus formed is treated exactly in the manner described in Example V above. The amount of purified silver sulfide precipitate recovered from the aqueous solution of the silver chloride precipitate shows that 100% of the silver added to the "return liquor" is recovered in the silver sulfide precipitate. Thereafter, the solution of silver sulfide precipitate in 1:1 sulfuric acid with a few drops of nitric acid added thereto, is effected precisely in the manner described in Example V above and the aqueous solution of silver sulfate obtained therefrom is recycled to further quantities of "return liquor" to remove halide ions therefrom.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of obtaining halide-free bichromate liquors, which includes roasting chrome ore containing halide compounds under alkaline conditions, leaching said roast to obtain a halide-containing liquor having a pH below 9, adding a source of silver ions thereto in an amount slightly less than the stoichiometric equivalent of halide ion present in said liquor to precipitate silver halide, separating said silver halide, recovering said halide-freed bichromate liquor, converting the silver of said silver halide precipitate to a water-soluble source of silver ions, and recycling said soluble source of silver ions to further amounts of said halide-containing aqueous liquor.

2. The method of obtaining halide-free bichromate liquors, which includes roasting chrome ore containing halide compounds under alkaline conditions, leaching said roast to obtain a halide-containing liquor having a pH below 9, adding a source of silver ions thereto in an amount slightly less than the stoichiometric equivalent of said halide ion, converting the silver halide precipitate to silver sulfide to precipitate silver halide, separating said silver halide, recovering said halide-freed bichromate liquor, converting said silver sulfide to a water-soluble source of silver ions, and recycling said soluble source of silver ions to further amounts of said halide-containing liquor.

3. The method of obtaining halide-free bichromate liquors, which includes roasting chrome ore containing halide compounds under alkaline conditions, leaching said roast to obtain a halide-containing liquor having a pH below 9, adding a source of silver ions thereto in an amount slightly less than the stoichiometric equivalent of said halide ion to precipitate silver halide, separating said silver halide, recovering said halide-freed bichromate liquor, converting said silver halide to a water-soluble silver halide complex, converting said soluble complex to silver sulfide, converting said silver sulfide to a substantially water-soluble source of silver ions, and recycling said soluble source of silver ions to further amounts of said halide-containing liquors.

4. The method of obtaining halide-free bichromate liquors, which includes roasting chrome ore containing halide compounds under alkaline conditions, leaching said roast to obtain a halide-containing liquor having a pH below 9, adding a source of silver ions thereto in an amount slightly less than the stoichiometric equivalent of said halide ion to precipitate silver halide, separating said silver halide, recovering said halide-freed bichromate liquor, converting said silver halide to silver sulfide, converting said silver sulfide to silver sulfate, and recycling said silver sulfate to further amounts of said halide-containing liquors.

5. The method of obtaining halide-free bichromate liquors, which includes roasting chrome ore containing halide compounds under alkaline conditions, leaching said roast to obtain a halide-containing liquor having a pH below 9, adding a source of silver ions thereto in an amount slightly less than the stoichiometric equivalent of said halide ion to precipitate silver halide, separating said silver halide, recovering said halide-freed bichromate liquor, converting said silver halide precipitate to a water-soluble silver halide complex, converting said soluble silver complex to silver sulfide, converting said silver sulfide to silver sulfate, and recycling said silver sulfate to further amounts of said halide-containing liquors.

ROBERT G. BANNER.

References Cited in the file of this patent

UNITED STATES PATENTS

| Number | Name | Date |
|---|---|---|
| 1,446,405 | Thomas | Feb. 20, 1923 |
| 2,416,551 | Udy | Feb. 25, 1947 |

OTHER REFERENCES

Prescott and Johnson: "Qualitative Chemical Analysis"; pages 46 to 56 (1901); publ. by D. Van Nostrand Co.

Scott: "Standard Methods of Chemical Analysis," fourth ed., vol. 1, pages 150, 151. Publ. by D. Van Nostrand Co., Inc., 250 4th Ave., N. Y. (1925).

Sabinina et al.: "Zavodskaya Lab.," vol. 7, pages 727–9 (1938); cited from Chem. Abstracts, vol. 33, column 83 (1939).